United States Patent
Hinterbuchinger

(10) Patent No.: US 10,933,924 B2
(45) Date of Patent: Mar. 2, 2021

(54) AIR GUIDING APPARATUS FOR A MOTOR VEHICLE BODY

(71) Applicant: Dr. Ing. h.c. F. Porsche Aktiengesellschaft, Stuttgart (DE)

(72) Inventor: Michael Hinterbuchinger, Stuttgart-Vaihingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 96 days.

(21) Appl. No.: 16/267,408

(22) Filed: Feb. 5, 2019

(65) Prior Publication Data

US 2019/0256157 A1    Aug. 22, 2019

(30) Foreign Application Priority Data

Feb. 22, 2018   (DE) .......................... 102018103970.0

(51) Int. Cl.
  *B62D 35/00*   (2006.01)
  *B62D 37/02*   (2006.01)
(52) U.S. Cl.
  CPC ........... *B62D 35/007* (2013.01); *B62D 37/02* (2013.01)
(58) Field of Classification Search
  CPC ....... B62D 35/00; B62D 35/007; B62D 37/02
  See application file for complete search history.

(56) References Cited

U.S. PATENT DOCUMENTS

| 4,925,236 | A | 5/1990 | Itoh et al. |
| 5,454,619 | A | 10/1995 | Haraway, Jr. |
| 7,387,331 | B2 * | 6/2008 | Froeschle ............ B62D 35/007 296/180.5 |
| 2013/0020822 | A1 * | 1/2013 | Inoue ....................... B60J 5/107 296/1.08 |
| 2014/0346810 | A1 | 11/2014 | Wild et al. |
| 2016/0304139 | A1 | 10/2016 | Handzel, Jr. |

FOREIGN PATENT DOCUMENTS

| DE | 102004030571 A1 | 1/2006 |
| DE | 102011088852 A1 | 6/2013 |
| DE | 102013105223 A1 | 11/2014 |
| DE | 102016106728 A1 | 10/2016 |
| JP | 62163875 A | 7/1987 |

* cited by examiner

*Primary Examiner* — D Glenn Dayoan
*Assistant Examiner* — Melissa Ann Bonifazi
(74) *Attorney, Agent, or Firm* — Leydig, Voit & Mayer, Ltd.

(57) ABSTRACT

An air guiding apparatus for a motor vehicle body includes a first air guiding element configured to be received in the motor vehicle body and to be moved, with the aid of an adjusting apparatus, into at least a first position and a second position. The first air guiding element is received in the motor vehicle body in the first position and, in the second position, the first air guiding element encloses an angle which has a value of less than 360° with the motor vehicle body. The first air guiding element is configured to extend in a direction of a vehicle transverse axis. The air guiding apparatus further includes a second air guiding element configured to extend, in an active position, in a direction of a vehicle longitudinal axis. The second air guiding element is further configured to be received at least partially in the first air guiding element.

17 Claims, 3 Drawing Sheets

AIR GUIDING APPARATUS FOR A MOTOR VEHICLE BODY

CROSS REFERENCE TO RELATED APPLICATIONS

This application claims benefit to German Patent Application No. DE 10 2018 103 970.0, filed Feb. 22, 2018, which is hereby incorporated by reference herein.

FIELD

The invention relates to an air guiding apparatus for a motor vehicle body.

BACKGROUND

Air guiding apparatuses comprising air guiding elements for motor vehicle bodies are known. The air guiding elements are, in particular, what are known as rear wings which are received movably on the motor vehicle body, in order that they can assume different positions relative to the motor vehicle body between a first end position and a second end position. In the first end position, the rear wing is arranged flush with the motor vehicle body, said rear wing being spaced apart to a maximum extent from the motor vehicle body in the second end position. A downforce of the motor vehicle which has the motor vehicle body can be varied during operation, in particular, with the aid of the rear wing.

The movable rear wing is connected to an adjusting apparatus of the air guiding apparatus, which adjusting apparatus moves the rear wing into its position which is correspondingly to be assumed, and holds said rear wing in said position. The adjusting apparatus is oriented relative to its position in the motor vehicle body with the aid of a fixed stop element, in order that flush positioning of the rear wing with the motor vehicle body can be brought about, play-free mounting of the rear wing being necessary at the same time.

As soon as the rear wing has extended from its flush positioning with the motor vehicle body, as is usually the case during driving operation, edge vortices are generated at lateral ends of the rear wing, which edge vortices in turn lead to an increase in the air resistance of the motor vehicle body.

Various possibilities for minimizing the increase in the air resistance are known from the prior art.

For instance, patent specification U.S. Pat. No. 4,925,236 A has disclosed an air guiding apparatus for a motor vehicle body, the air guiding element being configured in the form of a non-adjustable rear spoiler. In each case one winglet which is of adjustable configuration is provided in the region of the two outer ends of the rear spoiler.

Patent specification U.S. Pat. No. 5,454,619 A discloses an air guiding apparatus for a motor vehicle body having an air guiding element which can be adjusted in the direction of a vehicle longitudinal axis. Winglets which are fixed on the motor vehicle body are configured in the region of the ends of said air guiding element.

An air guiding apparatus for a motor vehicle body can be gathered from laid open specification DE 10 2016 106 728 A1, an air guiding element being configured rigidly on the motor vehicle body in a rear region of the latter, and having in each case one movable winglet at its ends.

SUMMARY

In an embodiment, the present invention provides an air guiding apparatus for a motor vehicle body. The air guiding apparatus includes a first air guiding element configured to be received in the motor vehicle body and to be moved, with the aid of an adjusting apparatus, into at least a first position and a second position. The first air guiding element is received in the motor vehicle body in the first position and, in the second position, the first air guiding element encloses an angle which has a value of less than 360° with the motor vehicle body. The first air guiding element is configured to extend in a direction of a vehicle transverse axis. The air guiding apparatus further includes a second air guiding element configured to extend, in an active position, in a direction of a vehicle longitudinal axis. The second air guiding element is further configured to be moved and to be received at least partially in the first air guiding element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
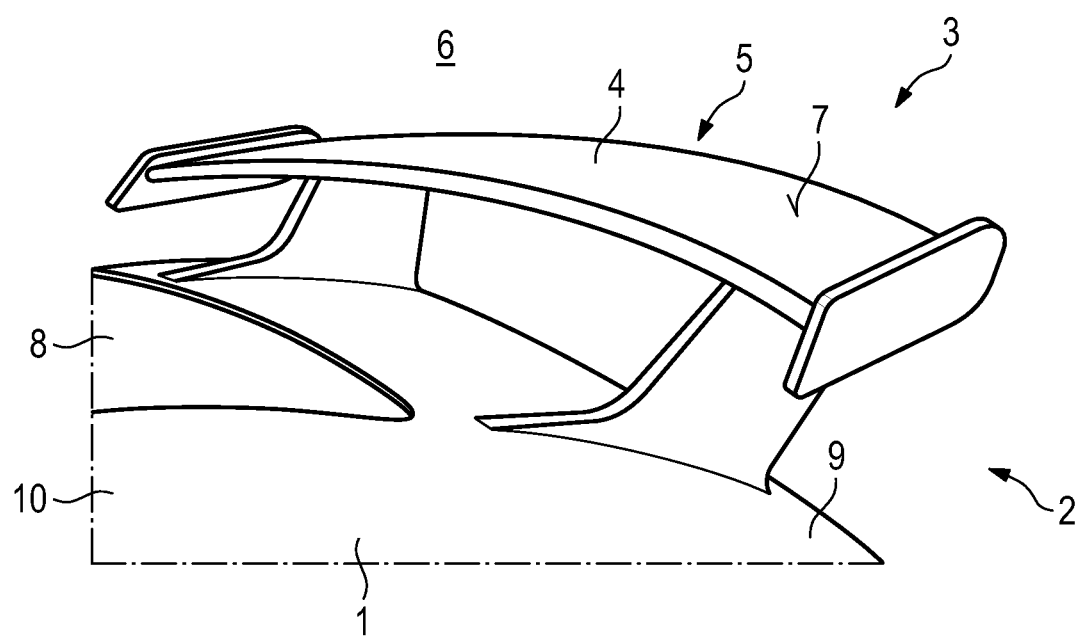
FIG. 1 provides a perspective detailed illustration of a motor vehicle body having an air guiding apparatus of predominantly rigid configuration in accordance with the prior art.

Embodiments of the invention specify a completely variable air guiding apparatus for a motor vehicle body capable of providing a low drag coefficient with a simultaneously high downforce.

An air guiding apparatus for a motor vehicle body has, according to an embodiment of the invention, an air guiding element received in the motor vehicle body and configured to be moved with the aid of an adjusting apparatus of the air guiding apparatus, and further configured to be moved into at least a first position and a second position. The air guiding element is received in the motor vehicle body in the first position and, in the second position, encloses an angle which has a value of less than 360° with the motor vehicle body. The air guiding element is configured so as to extend in the direction of a vehicle transverse axis. The air guiding apparatus has a further air guiding element which is configured so as to extend in the direction of a vehicle longitudinal axis in its active position. According to the embodiment of the invention, the further air guiding element is configured to be moved and to be received at least partially in the air guiding element.

An advantage is a reduction in fuel consumption of the motor vehicle which has the motor vehicle body with a simultaneous stable position at high speeds. A further advantage is the possibility to leave the motor vehicle body in its basic shape, that is to say, in other words, without the air guiding apparatus being visible, that is to say with a retracted air guiding element and with a retracted further air guiding element. That is to say, in other words, the impression of the basic shape is visible for the observer until at least the air guiding element is extended. Therefore, just like the air guiding element, the further air guiding element is integrated into the basic shape and is of movable configuration for bringing about a stable position of the motor vehicle and a reduction in the air resistance of the motor vehicle body when the air guiding element is extended. In particular, the further air guiding element is configured such that it can be received completely in the air guiding element.

The further air guiding element might be configured translationally and/or rotationally or rotatably on the air guiding element. The advantage of the rotatable configuration on the air guiding element can be seen in simple positioning and movement of the further air guiding element transversely with respect to the air guiding element, since merely the positioning into its active position can take place by way of a single movement.

For the effective avoidance of vortices at the ends of the air guiding element, the further air guiding element is received on the air guiding element such that it can be rotated along a rotational axis, the rotational axis being configured so as to extend along the vehicle longitudinal axis. This ensures that the further air guiding element is arranged precisely in the region of the generation of the vortices.

In a further refinement of the air guiding apparatus, the air guiding element is configured with a variable extent along the vehicle transverse axis. In this way, a higher downforce in comparison with a non-variable air guiding element can be achieved.

If the air guiding element and/or the further air guiding element are/is configured with a lightweight design, in particular are/is configured from a carbon composite material, the motor vehicle body overall can be configured with a reduced weight, and there is the possibility of a reduction in consumption and accordingly a reduction in emissions.

One refinement which is to be preferred, since it avoids vortices on account of open gaps and/or undercuts, is to be seen in a complementary configuration of the further air guiding element with a receiving opening of the air guiding element, the further air guiding element being configured such that it is received in the receiving opening.

In order to adapt the downforce and the air resistance, the further air guiding element is preferably of extendable configuration in an extended position of the air guiding element. That is to say, in other words, the air guiding element is to be extended before or with an extension of the further air guiding element.

A further advantage of the movable air guiding element is to be seen in the fact that it is configured, in particular, such that it can be extended at a driving resistance-relevant speed of the motor vehicle. That is to say, it can be used exclusively in the speed ranges in which it is required, since it might possibly bring about losses in the other speed ranges. In this way, the further air guiding element can be used effectively and efficiently.

Figure 2:
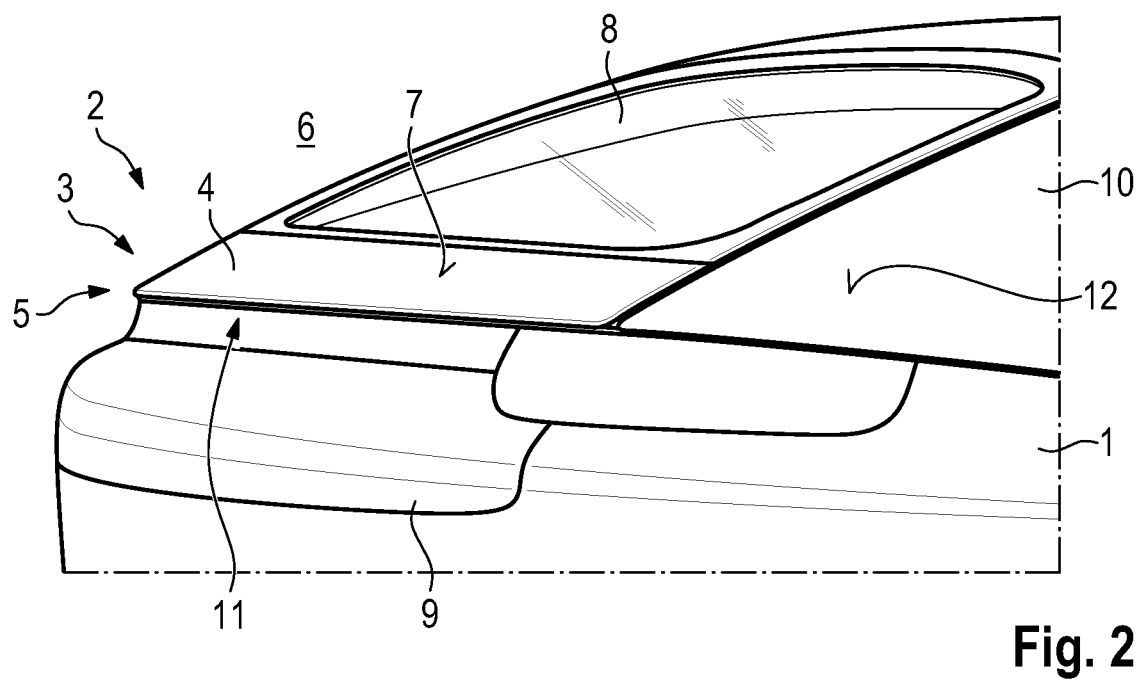
FIG. 2 provides a perspective detailed illustration of a motor vehicle body having an air guiding apparatus in a retracted state.
Figure 3:
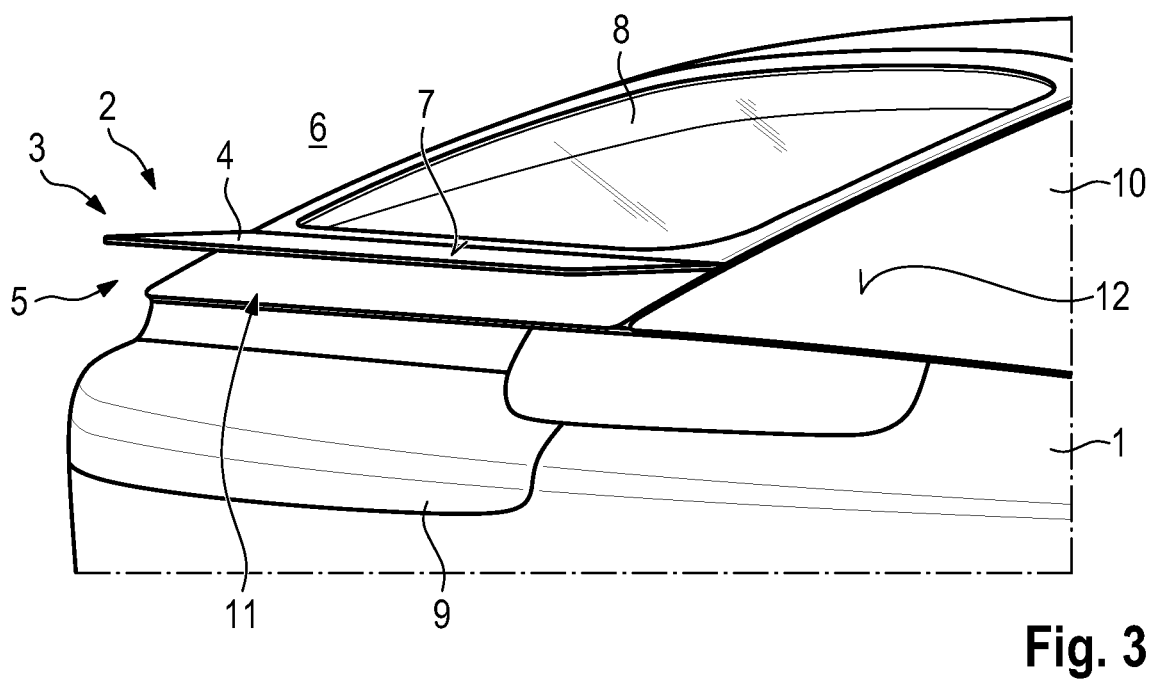
FIG. 3 provides a perspective detailed illustration of the motor vehicle body in accordance with FIG. 2 with the air guiding apparatus in the extended state.

A motor vehicle body 1 which is configured in a first example in accordance with FIG. 1 and in a second example in accordance with FIGS. 2 and 3 comprises an air guiding apparatus 3 in accordance with the prior art which is arranged in a rear region 2 of the motor vehicle body 1.

The air guiding apparatus 3 can be adjusted from a first operating position into a second operating position. In particular, a drag coefficient and a downforce of the motor vehicle body 1 can be varied with the aid of the air guiding apparatus 3. The air guiding apparatus 3 comprises at least one air guiding element 4 for flow control, which air guiding element 4 is connected to the adjusting apparatus 5. The air guiding element 4 is configured in the form of a rear wing and is called a wing in the following text. In particular, a wing upper surface 7 of the wing 4, which wing upper surface 7 is configured so as to face the surroundings 6, is of aerodynamic configuration.

In the rear region 2, the motor vehicle body 1 has a rear window 8 and a rear hood 9 which are arranged between side walls 10 of the motor vehicle body 1. The rear hood 9 of the motor vehicle 1 in accordance with FIGS. 2 and 3 is configured with an opening 11, in which the wing upper surface 7 is arranged flush with a vehicle body surface 12 of the motor vehicle body 1 in a first end position.

In a second end position, as shown in principle in FIG. 3, the wing upper surface 7 encloses an angle which has a value of less than 360° with the vehicle body surface 12, the wing 4 having been moved into said second end position with the aid of the adjusting apparatus 5. With the aid of the adjusting apparatus 5, the wing 4 can be moved into different intermediate positions which lie between the first end position and the second end position from the first operating position into the second operating position, and can be held there. The active direction of the wing 4 extends predominantly along a vehicle transverse axis 18.

Figure 4:
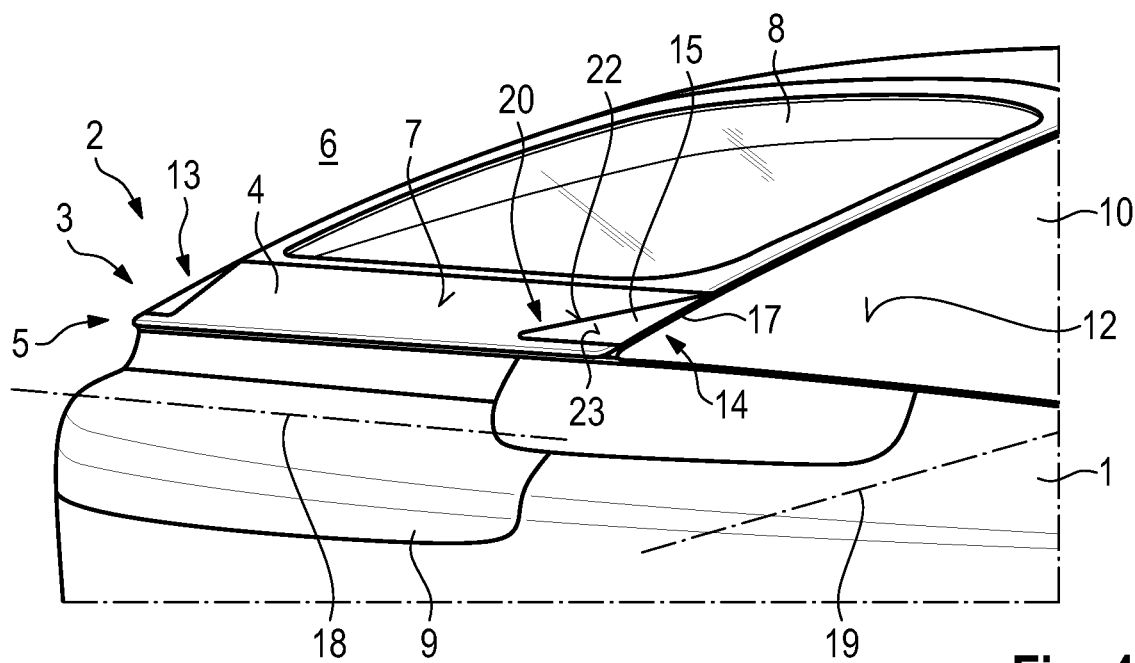
FIG. 4 provides a perspective detailed illustration of a motor vehicle body having an air guiding apparatus according to an embodiment of the invention in a retracted state.
Figure 5:
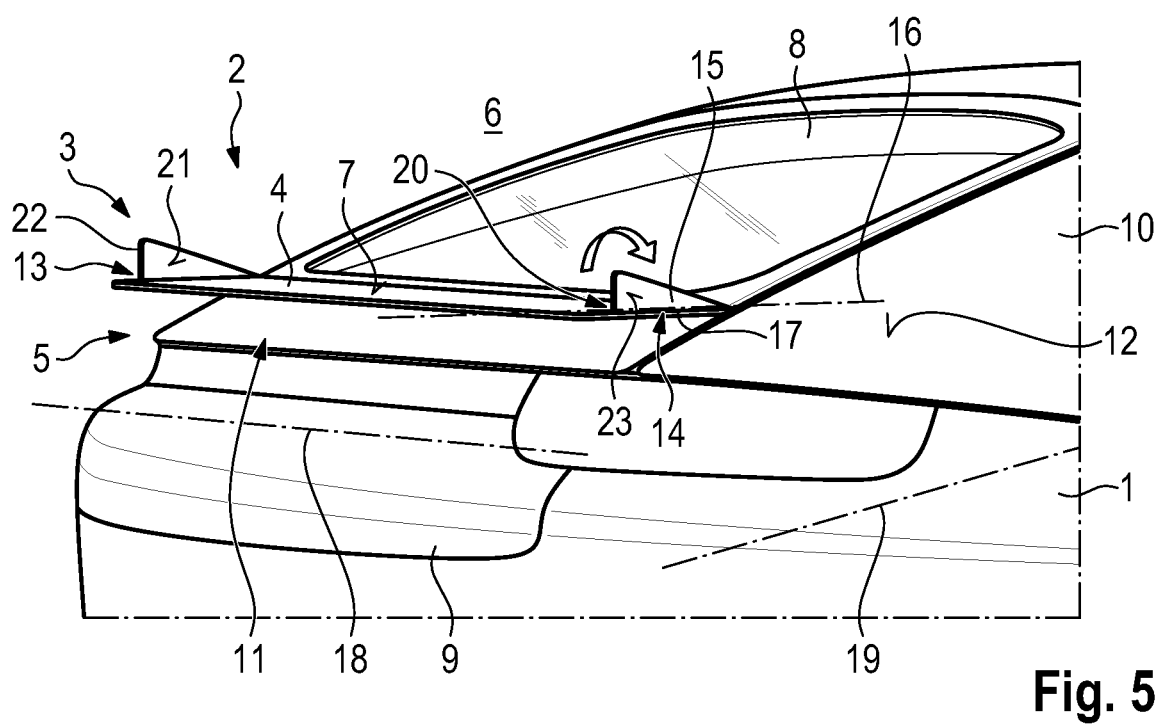
FIG. 5 shows a perspective detailed view of the motor vehicle body in accordance with FIG. 4 with the air guiding apparatus in the extended state.

The air guiding apparatus 3 according to the invention is illustrated in FIGS. 4 and 5 in a perspective detailed illustration of the motor vehicle body 1. At its two ends, its first wing end 13 and its second wing end 14 which are arranged so as to face the side walls 10 in each case, the wing 4 has side wings 15 which are also called winglets.

The side wings 15 are configured such that they can be positioned in the wing 4. That is to say, in other words, they are configured such that they can be retracted into the wing 4, as illustrated in FIG. 4, and can be extended from the wing 4, as shown in FIG. 5.

The side wings 15 are configured such that they can be moved about a rotational axis 16, the rotational axis 16 in the present exemplary embodiment corresponding to a side edge 17 of the wing 4. The rotational axis 16 is configured so as to extend along a vehicle longitudinal axis 19, the vehicle longitudinal axis 19 being positioned normally with respect to the vehicle transverse axis 18. With regard to their active position, the side wings 15 are configured so as to extend along the vehicle longitudinal axis 19.

The wing 4 has in each case one receiving opening 20 for receiving the side wings 15 in the region of the first wing end 13 and in the region of the second wing end 14, into which receiving opening 20 the side wing 15 can be received completely. In the present exemplary embodiment, the receiving opening 20 is of trough-like configuration, and is therefore configured so as to not penetrate the wing 4 completely. The receiving opening 20 might likewise also be configured so as to penetrate the wing 4 completely; then, in particular, the air flow which is guided through said receiving opening 20 is to be taken into consideration during the design of the air guiding apparatus 3. The side wing 15 might also not be received completely in the receiving opening 20 in its retracted position, this being a design aspect, in particular.

In the present exemplary embodiment, the receiving opening 20 is of complementary configuration with respect to the side wing 15, the receiving opening 20 being of complementary configuration with respect to a lower surface 21 of the side wing 15, which lower surface 21 is configured so as to face the wing 4, and with respect to circumferential surfaces 22, between which the lower surface 21 and an upper surface 23 of the side wing 15, which upper surface 23 is configured so as to face away from the lower surface 21, are received. In the retracted state of the side wing 15, the upper surface 23 is configured so as to be flush with the vehicle body surface 12 and therefore flush with the wing upper surface 7.

In the present exemplary embodiment, the wing 4 is configured with a variable extent along the vehicle transverse axis 18. In the retracted state, that is to say in the first end position, its extent is configured so as to be adapted with respect to it being received in the opening 11. In an extended state, as shown in FIG. 5, the wing 4 has a greater extent than in the first end position. That is to say, in other words, it is configured so as to extend beyond the opening 11 in the direction of the vehicle transverse axis 18.

During operation of the air guiding apparatus 3, the side wings 15 are configured such that they can be extended at the same time as or after the extending of the air guiding element 4, the side wings 15 being configured such that they can be extended at an, in particular, drag-relevant speed of a motor vehicle which has the motor vehicle body 1. This can be regulated, however, in a manner which is dependent on the desired driving behavior of the motor vehicle.

The air guiding apparatus 3, in particular the wing 4 and the side wings 15, are manufactured from a carbon composite material in a lightweight design.

Therefore, on account of the side wings 15 which are received movably in the wing 4, it is possible to maintain a stylistically important basic shape of the motor vehicle body 1, it nevertheless being possible for safe driving with a low fuel consumption to be realized during driving operation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Motor vehicle body
2 Rear region
3 Air guiding apparatus
4 Air guiding element
5 Adjusting apparatus
6 Surroundings
7 Wing upper surface
8 Rear window
9 Rear hood
10 Side wall
11 Opening
12 Vehicle body surface
13 First wing end
14 Second wing end
15 Side wing
16 Rotational axis
17 Side edge
18 Vehicle transverse axis
19 Vehicle longitudinal axis
20 Receiving opening
21 Lower surface
22 Circumferential surface
23 Upper surface

What is claimed is:

1. An air guiding apparatus for a motor vehicle body, comprising:
a first air guiding element configured to be received in the motor vehicle body and to be moved, with the aid of an adjusting apparatus, into at least a first position and a second position, wherein the air first guiding element is received in the motor vehicle body in the first position and, wherein in the second position, the air guiding element encloses an angle which has a value of less than 360° with the motor vehicle body, and wherein the first air guiding element is configured to extend in a direction of a vehicle transverse axis; and
a second air guiding element configured to extend, in an active position, lengthwise in a direction of a vehicle longitudinal axis and heightwise in a vertical direction away from a top side of the first air guiding element, wherein the second air guiding element is further configured to be moved and to be received at least partially in the first air guiding element.

2. The air guiding apparatus as claimed in claim 1, wherein the second air guiding element is configured to be received completely in the first air guiding element.

3. The air guiding apparatus as claimed in claim 1, wherein the second air guiding element is configured rotatably on the first air guiding element, a rotation axis extending along the vehicle longitudinal axis.

4. The air guiding apparatus as claimed in claim 1, wherein the second air guiding element is received on the first air guiding element so as to be rotatable along a rotational axis, wherein the rotational axis extends along the vehicle longitudinal axis.

5. The air guiding apparatus as claimed in claim 1, wherein the second air guiding element extends along the vehicle longitudinal axis in the active position.

6. The air guiding apparatus as claimed in claim 1, wherein the first air guiding element has an extent of variable configuration along the vehicle transverse axis.

7. The air guiding apparatus as claimed in claim 1, wherein the first air guiding element and the second air guiding element comprise a carbon composite material.

8. The air guiding apparatus as claimed in claim 1, wherein the second air guiding element is of complementary configuration with respect to a receiving opening of the first air guiding element.

9. The air guiding apparatus as claimed in claim 1, wherein the second air guiding element is of extendable configuration in an extended position of the air guiding element.

10. The air guiding apparatus as claimed in claim 1, wherein the second air guiding element is configured to be extended at a driving resistance-relevant speed of a motor vehicle that includes the motor vehicle body.

11. The air guiding apparatus as claimed in claim 1, wherein the first air guiding element and the second air guiding element are configured, in a retracted state, to be integrated into a basic shape of the motor vehicle body.

12. The air guiding apparatus as claimed in claim 1, wherein the first air guiding element is a wing.

13. The air guiding apparatus as claimed in claim 12, wherein the second air guiding element comprises a first winglet and a second winglet, wherein the first winglet is at a first wing end of the first air guiding element, and the second winglet is at a second wing end of the first air guiding element, the second wing end being opposite the first wing end in the vehicle transverse direction.

14. The air guiding apparatus as claimed in claim 13, wherein the first winglet and the second winglet are configured to retract into receiving openings of the first air guiding element in a retracted position.

15. The air guiding apparatus as claimed in claim 14, wherein each of the receiving openings is has complementary configuration with a respective one of the first winglet or the second winglet.

16. The air guiding apparatus as claimed in claim 15, wherein the first winglet and the second winglet are configured such that, in the retracted state, upper surfaces of the first winglet and the second winglet are configured so as to be flush with a wing upper surface of the first air guiding element.

17. The air guiding apparatus as claimed in claim 14, wherein the receiving openings extend completely through the first air guiding element such that, in an active position, the first air guiding element is configured to guide air through the receiving openings.

* * * * *